US011953953B2

(12) United States Patent
Cuenca et al.

(10) Patent No.: US 11,953,953 B2
(45) Date of Patent: Apr. 9, 2024

(54) BEHIND THE RADOME MOUNTING SYSTEM FOR AIRCRAFT AVIONICS EQUIPMENT

(71) Applicant: The Boeing Company, Chicago, IL (US)

(72) Inventors: Ramon L. Cuenca, Buena Park, CA (US); Shellini P. Dowell, Bellevue, WA (US); Thomas A. Jessett, Bellevue, WA (US); Fadl I. Khalil, Edmonds, WA (US); Warren S. Ng, Irvine, CA (US); Scott B. Vacknitz, Kirkland, WA (US); Collis M. Walker, Stanton, CA (US); Archibald A. Gray, Seattle, WA (US); James C. Russell, Bellevue, WA (US); Charles O. Adler, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 1546 days.

(21) Appl. No.: 16/144,165

(22) Filed: Sep. 27, 2018

(65) Prior Publication Data

US 2020/0102080 A1    Apr. 2, 2020

(51) Int. Cl.
*G06F 1/18* (2006.01)
*B64D 45/00* (2006.01)
(Continued)

(52) U.S. Cl.
CPC ............. *G06F 1/182* (2013.01); *B64D 45/00* (2013.01); *G01S 5/183* (2013.01); *G01S 13/953* (2013.01);
(Continued)

(58) Field of Classification Search
CPC .. B64C 1/36; B64D 45/00; B64D 2045/0065; G01S 5/183; G01S 7/027; G01S 13/953;
(Continued)

(56) References Cited

U.S. PATENT DOCUMENTS 5,121,128 A * 6/1992 van Lidth de Jeude .....................
H01Q 21/29
343/705
5,597,335 A * 1/1997 Woodland ............... B63B 7/082
114/348

(Continued)

*Primary Examiner* — Timothy J Thompson
*Assistant Examiner* — Rhadames Alonzo Miller
(74) *Attorney, Agent, or Firm* — MH2 Technology Law Group LLP

(57) ABSTRACT

An avionics unit assembly for an aircraft can include an avionics unit (e.g., an underwater locator device, "ULD"), and a battery to power the avionics unit. The avionics unit assembly can further include a housing that encases the avionics unit and the battery. The housing includes a vent port for exhausting an emission from the housing during a failure of the avionics unit. The avionics unit assembly can further include one or more of a suppressor that filters the emission, a shield element that is resistant to chemical and/or thermal effects of the emission, and a bracket for mounting the avionics unit to a surface. A method integrating the avionics unit assembly onto a forward aircraft bulkhead at a mount location under an aircraft radome and for manufacturing the avionics unit, and an aircraft including the avionics unit are also described.

35 Claims, 9 Drawing Sheets

(51) Int. Cl.
*G01S 5/18* (2006.01)
*G01S 7/02* (2006.01)
*G01S 13/95* (2006.01)
*H01M 10/052* (2010.01)
*H01M 50/202* (2021.01)
*H01M 50/244* (2021.01)
*H01M 50/262* (2021.01)
*H01M 50/375* (2021.01)

(52) U.S. Cl.
CPC .......... *G06F 1/188* (2013.01); *H01M 50/202* (2021.01); *H01M 50/244* (2021.01); *H01M 50/262* (2021.01); *H01M 50/375* (2021.01); *B64D 2045/0065* (2013.01); *G01S 7/027* (2021.05); *H01M 10/052* (2013.01); *H01M 2220/20* (2013.01)

(58) Field of Classification Search
CPC ............... H01M 50/375; H01M 50/24; H01M 2220/20; H01M 50/202; Y02E 60/10
See application file for complete search history.

(56) References Cited

U.S. PATENT DOCUMENTS

| | | | | |
|---|---|---|---|---|
| 5,982,090 | A * | 11/1999 | Kalmanash | G02B 6/0043 313/493 |
| 6,011,504 | A * | 1/2000 | Tan | H05K 9/0001 174/379 |
| 6,166,661 | A * | 12/2000 | Anderson | B64D 15/20 244/134 R |
| 7,190,090 | B2 * | 3/2007 | Shi | H02J 1/102 307/64 |
| 10,054,104 | B1 * | 8/2018 | Cote | G05D 1/10 |
| 10,713,859 | B1 * | 7/2020 | McZeal, Jr. | G01S 19/17 |
| 11,069,939 | B2 * | 7/2021 | Russell | G01S 5/0231 |
| 11,710,957 | B1 * | 7/2023 | Manadan | H02J 7/0031 307/9.1 |
| 2005/0125120 | A1 * | 6/2005 | Huynh | H05K 7/1412 701/36 |
| 2009/0237272 | A1 * | 9/2009 | Georgeson | B64D 45/02 244/119 |
| 2011/0120750 | A1 * | 5/2011 | Hucker | H01B 5/14 427/105 |
| 2011/0189440 | A1 * | 8/2011 | Appleby | B29C 33/38 523/435 |
| 2011/0293376 | A1 * | 12/2011 | Goulet | E02B 15/08 405/64 |
| 2013/0132522 | A1 * | 5/2013 | Ruppin | B64D 45/0015 709/219 |
| 2014/0175225 | A1 * | 6/2014 | Durand | B64D 11/00 244/129.6 |
| 2016/0084623 | A1 * | 3/2016 | Facciano | F41G 7/2253 342/372 |
| 2016/0234581 | A1 * | 8/2016 | Gauthier | H04B 10/803 |
| 2016/0320484 | A1 * | 11/2016 | Lanham | B63G 8/38 |
| 2017/0106997 | A1 * | 4/2017 | Bekanich | G08B 25/10 |
| 2018/0123232 | A1 * | 5/2018 | Shope | H01Q 1/04 |
| 2018/0246200 | A1 * | 8/2018 | Goossen | G01S 19/03 |
| 2019/0037675 | A1 * | 1/2019 | Sulzbach | H05F 3/00 |
| 2020/0013263 | A1 * | 1/2020 | Lee | G08B 5/002 |
| 2020/0106067 | A1 * | 4/2020 | Russell | G01S 5/0231 |
| 2021/0001999 | A1 * | 1/2021 | Massa | B64D 25/20 |
| 2021/0336431 | A1 * | 10/2021 | Madhusudan | H02G 13/60 |
| 2022/0115878 | A1 * | 4/2022 | Khozikov | B60L 58/18 |
| 2022/0255335 | A1 * | 8/2022 | Khozikov | H02J 7/14 |
| 2023/0156951 | A1 * | 5/2023 | Wicks | B64C 1/36 361/260 |

* cited by examiner

BEHIND THE RADOME MOUNTING SYSTEM FOR AIRCRAFT AVIONICS EQUIPMENT

TECHNICAL FIELD

The present teachings relate to the field of aircraft subsystems and, more particularly, to the protection of aircraft during failure of battery-powered subsystems.

BACKGROUND

Commercial aircraft include various electronic devices generally referred to as avionics equipment, aviation electronics equipment, and avionics systems. This avionics equipment performs a wide variety of functionality, ranging from aircraft control, surveillance of airspace, communications, lighting, and other functions. Avionics equipment is typically powered by aircraft power systems, including those powered by aircraft generator or battery systems; in some cases, however, the function of some avionics equipment may require an internal power source, such as a battery.

Incidents including energetic failures of high power density lithium batteries have resulted in considerable industry and regulatory attention to ensuring aircraft safety under worst-case failure conditions for avionics equipment powered by internal lithium batteries. The United States Federal Aviation Agency (FAA) and European Aviation Safety Agency (EASA) in particular have applied stringent battery failure characterization and mitigation requirements known as "special conditions."

An example of new avionics equipment utilizing lithium batteries to provide important functionality is low frequency underwater locator devices which has been mandated by multiple international regulators for the intended function of assisting in the location of downed aircraft and debris field underwater.

Each commercial aircraft currently includes underwater locator beacons (ULB's) attached to the flight data recorder (FDR) and cockpit voice recorder (CVR) to precisely locate these aircraft subcomponents. When immersed in water, the self-powered (i.e., battery-powered) ULB's emit an ultrasonic acoustic pulse of about 37.5 kilohertz (kHz) for at least 90 days. When the aircraft is in very deep water, the three mile range and 90 day lifetime can prove insufficient for locating the aircraft. For example, search vehicles (e.g., ships and aircraft) must be positioned almost directly over the aircraft to detect the ultrasonic signal emitted from the ULB's when the aircraft is in deep water.

To improve the location of underwater aircraft, recent international regulations have begun to require the use of low-frequency underwater locator devices (LF-ULD's) in addition to the ULB's to improve location of the aircraft. The LF-ULD outputs a low frequency acoustic pulse of 8.8 kHz for at least 90 days compared to the 37.5 kHz pulse and 30 day operational lifetime for the ULB. (For purposes of this disclosure, a "low frequency" pulse is a pulse below 10 kHz, for example, because a pulse train below 10 kHz maximizes signal propagation through sea water and matches a spectral sensitivity of receivers designed to detect the LF-ULD output). The longer detection range of the LF-ULD allows for a more rapid location of the downed aircraft and assists in the location of the shorter-range ULB signals. Thus the LF-ULD improves the likelihood of flight data and voice recorder recovery and decreases the recovery time.

The LF-ULD is an example of a device that relies on one or more internal lithium batteries to function. Lithium batteries provide high power densities, long installed life, and excellent stability and performance over a wide range of temperatures that make them an important enabler for LF-ULD functionality. Lithium batteries also generally have outstanding safety records with worst-case failures only very rarely encountered in practice even with the large number of batteries deployed in a multitude of uses.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, an avionics unit assembly for an aircraft includes an avionics unit, a battery configured to power the avionics unit, and a housing that encases the battery and the avionics unit, wherein the housing includes a vent port configured to exhaust an emission from the avionics unit during a failure of the avionics unit and the emission has one or more of a gas component, a vapor component, a liquid component, and a particulate component. The avionics unit assembly further includes a shield element, a emission shroud defining a receptacle, and a bracket, wherein the avionics unit, the emission shroud, and the shield element are mounted to the bracket.

Optionally, the bracket can include a hole therethrough and can be positioned between the avionics unit and the emission shroud. Further, the shield element can be mounted to the emission shroud and the shield element can define a recess. The avionics unit can be configured such that, during the failure of the avionics unit, the emission passes through the hole defined by the bracket and into the recess to directly impinge on the shield element. The emission shroud can be positioned between the avionics unit and the bracket, and the shield element can be positioned between the emission shroud and the bracket.

In an implementation, the avionics unit can include a suppressor positioned between the avionics unit and the emission shroud, wherein the suppressor is configured to filter and/or capture at least one of the liquid component and the particulate component of the emission during the failure of the avionics unit. The suppressor can be positioned between the avionics unit and the bracket, and the shield element can be positioned between the emission shroud and the bracket. Optionally, the suppressor can be positioned between the avionics unit and the shield element. The avionics unit can be mounted directly to the bracket. Further optionally, the suppressor and the emission shroud can be positioned between the avionics unit and the shield element, and the avionics unit can directly mounted to the bracket. The bracket can define a plurality of fastener holes therethrough configured to mount the avionics unit to a forward bulkhead of the aircraft. The avionics unit can be a low-frequency underwater locator device.

In another implementation, an avionics unit assembly for an aircraft includes an avionics unit, a battery configured to power the avionics unit, and a housing that encases the avionics unit and the battery. The housing includes a vent port configured to exhaust an emission from the avionics unit during a failure of the avionics unit and the emission includes one or more of a gas component, a vapor component, a liquid component, and a particulate component. The avionics unit assembly further includes a suppressor mounted to the avionics unit and configured to capture at least one of the particulate component and liquid component of the emission, a shield element mounted to the avionics unit and positioned within an emission stream of the emission, and a bracket mounted to the shield element, the suppressor and the avionics unit. Optionally, the avionics unit can be a low-frequency underwater locator device.

In another implantation, an avionics unit assembly for an aircraft includes a self-powered avionics unit having a battery as an internal power source and a housing including a vent port for exhausting an emission, with the emission including at least one of a gas component, a vapor component, a liquid component, and a particulate component, wherein the emission is exhausted from the housing through the vent port during a failure of the battery. The avionics unit assembly further includes a bracket having a first mounting arm and a second mounting arm attached to the self-powered avionics unit, wherein the bracket is configured to mount the self-powered avionics unit to a surface. The avionics unit assembly further includes at least one emission shroud attached to one of the first mounting arm and the second mounting arm, wherein the at least one emission shroud is configured to capture at least one of the particulate component and the liquid component of the emission, and at least one corrosive jet-resistant shield element mounted to the at least one emission shroud.

Optionally, the at least one emission shroud can a first emission shroud and the at least one corrosive jet-resistant shield element can be a first corrosive jet-resistant shield element. The first emission shroud and the first corrosive jet-resistant shield element can be mounted to the first mounting arm. The avionics unit can further include a second emission shroud and a second corrosive jet-resistant shield element mounted to the second mounting arm, a first suppressor positioned between the first emission shroud and the first corrosive jet-resistant shield element, and a second suppressor positioned between the second emission shroud and the second corrosive jet-resistant shield element. The avionics unit can be a low-frequency underwater locator device.

In another implementation, an avionics unit assembly for an aircraft includes a self-powered avionics unit having a battery as an internal power source and a housing including a body and at least one detachable end cap configured to provide a vent port for exhausting an emission during failure of the avionics unit, wherein the emission includes at least one of a gas component, a vapor component, a liquid component, and a particulate component. The avionics unit assembly further includes a bracket having a first arm and at least a second arm attached to the housing, a first emission shroud mounted to the first arm and a second emission shroud mounted to the second arm, and a first corrosive jet-resistant shield element mounted to the first emission shroud and a second corrosive jet-resistant shield element mounted to the second emission shroud.

Optionally, the avionics unit assembly can further include a first suppressor positioned between the first emission shroud and the first corrosive jet-resistant shield element and a second suppressor positioned between the second emission shroud and the second corrosive jet-resistant shield element. The avionics unit can be a low-frequency underwater locator device.

In another implementation, an aircraft includes a forward bulkhead, a radome mounted to the forward bulkhead, wherein a volume between the forward bulkhead and the radome is external to an aircraft pressure vessel, and an avionics unit assembly mounted to the forward bulkhead and positioned directly between the radome and the forward bulkhead in a direction perpendicular to a major plane of the forward bulkhead. The avionics unit assembly includes an avionics unit, a battery configured to power the avionics unit, and a housing that encases the avionics unit and the battery, wherein the housing has a vent port configured to exhaust an emission from the avionics unit during a failure of the avionics unit, and the emission includes one or more of a gas component, a vapor component, a liquid component, and a particulate component. The avionics unit assembly further includes a shield element, an emission shroud defining a receptacle, and a bracket, wherein the avionics unit, the emission shroud, and the shield element are mounted to the bracket.

Optionally, the bracket can be configured to provide a heat shield for the avionics unit during the failure of the battery. Further, the bracket can include a hole therethrough and can be positioned between the avionics unit and the emission shroud. The shield element can be mounted to the emission shroud and can define a recess. The avionics unit can be configured such that, during the failure of the avionics unit, the emission passes through the hole defined by the bracket and into the recess to directly impinge on the shield element. Further optionally, the avionics unit further having a suppressor positioned between the avionics unit and the emission shroud, wherein the suppressor is configured to filter and/or capture at least one of the liquid component and the particulate component of the emission during the failure of the avionics unit.

Optionally, the suppressor can be positioned between the avionics unit and the bracket. Further, the shield element can be positioned between the emission shroud and the bracket. Additionally, the aircraft can further include a weather radar antenna mounted to the forward bulkhead, wherein the avionics unit is positioned outside of the weather radar antenna swept volume. The forward bulkhead can include at least one equipment maintenance port, wherein a position of the avionics unit permits access to the at least one equipment maintenance port without requiring disassembly and/or removal of other structures positioned adjacent to the radome. The aircraft can further include a glide slope antenna and an instrument landing system antenna, wherein the avionics unit is positioned so that a centerline of the avionics unit is aligned with a centerline of the glide slope antenna and a centerline of the instrument landing system antenna. The avionics unit can be positioned such that the avionics unit is completely shielded from an electromagnetic field generated by the instrument landing system antenna. Further, the instrument landing system antenna can be positioned between the radome and the forward bulkhead. In another optional implementation, the avionics unit can be at least partially unshielded from an electromagnetic electric field generated by the instrument landing system antenna, the instrument landing system can be positioned between the radome and the forward bulkhead, and the avionics unit can have at least one of a height, a length, and width dimension that is less than $\frac{1}{8}^{th}$ of a radio frequency signal wavelength that is output and/or received by the instrument landing system antenna.

Further optionally, the avionics unit can positioned away from a longitudinal, geometric, or bilateral centerline of the aircraft, and the aircraft can further include an instrument landing system glide slope antenna configured to generate and/or receive an electromagnetic field. The forward bulkhead can be at least partially formed by a vertical I-beam, a horizontal I-beam, or both a vertical I-beam and a horizontal I-beam, and the avionics unit can be completely shielded from the electromagnetic field and at least partially shielded from the electromagnetic field by the vertical I-beam, the horizontal I-beam, or both the vertical I-beam and the horizontal I-beam.

The avionics unit can be is positioned away from a longitudinal, geometric, or bilateral centerline of the aircraft, and the avionics unit can be electrically isolated from the forward bulkhead.

In another implementation, a method for manufacturing an aircraft includes mounting an avionics unit assembly to a bulkhead, wherein the avionics unit assembly includes an avionics unit, a shield element, an emission shroud defining a receptacle, and a bracket, wherein the avionics unit, the emission shroud, and the shield element are mounted to the bracket. The method further includes mounting a radome to the bulkhead wherein, subsequent to the mounting of the avionics unit to the bulkhead and the mounting of the radome to the bulkhead, the avionics unit assembly is positioned directly between the radome and the bulkhead in a direction perpendicular to a major plane of the bulkhead.

Optionally, the mounting of the avionics unit to the bulkhead can further include positioning the avionics unit outside of a weather radar antenna swept volume. Further optionally, the bulkhead can include at least one equipment maintenance port, and the method can further include positioning the avionics unit at a location that permits access to the at least one maintenance port without requiring disassembly and/or removal of other structures positioned adjacent to the radome.

The avionics unit assembly can further include a battery configured to power the avionics unit and a housing that encases the battery and the avionics unit. The housing can include a vent port configured to exhaust an emission from the avionics unit during a failure of the avionics unit, and the emission can include one or more of a gas component, a vapor component, a liquid component, and a particulate component. The method can further include mounting the emission shroud to the bracket, and can include mounting a corrosive jet-resistant shield element to the emission shroud. The mounting of the emission shroud to the bracket can further include positioning the bracket such that an emission ejected through the vent port during the failure of the avionics unit passes through a hole defined by the bracket, into a recess defined by the emission shroud, and onto the corrosive jet-resistant shield element. The method can additionally include positioning a suppressor between the avionics unit and the emission shroud, wherein the suppressor is configured to filter and/or capture the particulate component and a fluid component of the emission prior to an ejection of the emission from the avionics unit.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
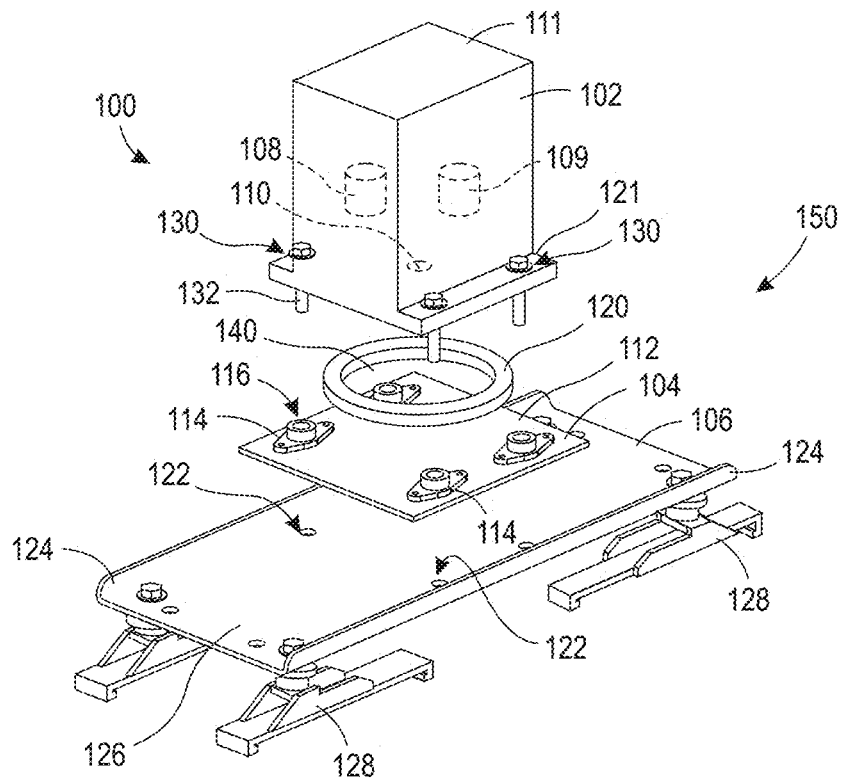
FIG. 1 is an exploded perspective depiction of an avionics unit in accordance with an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As discussed above, currently applicable and forthcoming international regulations will require the incorporation of low-frequency underwater locator devices (LF-ULD's) into commercial aircraft designs to assist in the location of aircraft during a water event. Operation of the low frequency ULD over a minimum of 90 days in harsh, deep-ocean environments requires a high performance internal power source with stable performance over a long lifetime that may be best met by utilizing a lithium battery that is configured to power the LF-ULD.

While lithium batteries have a very low failure, codified industry standards and regulatory rules (the special conditions discussed above) require the characterization and mitigation of worst case battery failure conditions. With these relatively new standard and rules, avionics units, such as an LF-ULD, utilizing or relying on lithium batteries to support key functions, can provide significant challenges for aircraft installation and integration design in order to support the required functionality while meeting the special conditions required for certification of lithium batteries. The system design and method described in this application present various structures and techniques to provide avionics equipment such as LF-ULD's powered by lithium batteries that conform to requirements in a novel and effective manner.

During a worst-case failure, an internal power source such as a lithium ion battery can exhaust toxic gases as well as high temperature particles such as metal particles and carbon particles. While lithium ion batteries have an extremely low failure rate and excellent safety records, federal and international regulations require testing to include electrical and/or thermal biasing of such batteries to the point of inducing a worst-case failure (a "thermal runaway" failure condition, analysis of the failure results, and protection of the aircraft and personnel (e.g., passengers and crew) in the event that one or more batteries of the device do fail in this manner The very large majority of avionics systems and equipment have heretofore been positioned within the environmentally controlled fuselage or cabin space of the aircraft where air pressure, ambient temperature, moisture levels, and other environmental conditions are carefully controlled for the protection and comfort of personnel therewithin. Further, these devices have been attached to structures such as the flight data recorder and cockpit voice recorders without taking protective measures as rates of worst-case failures in the field have been so low or non-existent so as not to be a concern.

An implementation of the present teachings thus includes a battery-powered avionics unit (i.e., avionics unit assembly) including a device such as a LF-ULD or other avionics system having one or more protection safeguards in case of device failure from one or more failure modes, including a worst-case battery failure. In another implementation, an aircraft includes a battery-powered avionics unit having one or more protection safeguards in case of device failure from one or more failure modes, including battery failure. Yet another implementation includes a method for manufacturing a battery-powered avionics unit having one or more protection safeguards in case of device failure, and a method for manufacturing an aircraft including an avionics unit having one or more protection safeguards in case of device failure.

Figure 2:
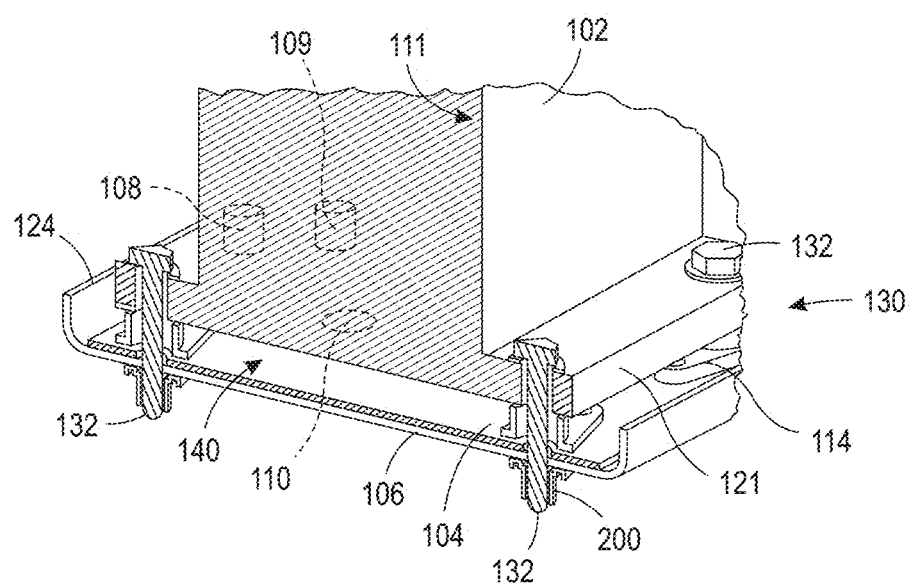
FIG. 2 is a magnified view depicting a portion of the FIG. 1 avionics unit after assembly.

FIG. 1 is an exploded perspective depiction of an avionics unit assembly 100 in accordance with an example implementation of the present teachings. FIG. 2 is a partial sectional view of the FIG. 1 structures assembling the FIG. 1 structures together. The avionics unit assembly 100 of FIG. 1 includes a self-powered (i.e., battery powered) avionics unit 102 such as an LF-ULD, a shield element 104, and a mounting bracket (i.e., bracket) 106. It will be appreciated that the figures depict generalized example implementations, and an actual avionics unit in accordance with the present teachings can include other structures that are not depicted for simplicity, while various depicted structures can be removed or modified.

The avionics unit 102 includes a battery power supply 108 that powers operation of the electronics (e.g., functional or mechanical) components (e.g., a ULD transmitter 109 such as an LF-ULD transmitter) of the avionics unit 102 during use, for example, when immersed in water. The ULD transmitter 109 is configured to output an acoustic signal (i.e., a "chirp"). The battery power supply 108 can be or include, for example, lithium-ion battery technology. The avionics unit 102 can further include a housing 111 having at least one vent port 110 that functions as a valve through which an emission including at least one of a gas component, a vapor component, a liquid component, and a particulate component (e.g., solid or molten particles) is exhausted and can escape from the housing during a failure of the avionics unit 102, for example, during failure of the battery power supply 108 or other components of the avionics unit 102. The housing 111 encases the battery 108 and the ULD transmitter 109. While FIG. 1 depicts the vent port 110 opening at a first surface (e.g., lower surface) of the avionics unit 102, it will be appreciated that other vent port configurations are contemplated, for example, the vent port opening at a second surface (e.g., upper surface) that is opposite the first surface, or the vent port opening at a third surface (e.g., side surface) that is between the first surface and the second surface.

The shield element 104 can be or include a flat or contoured plate 112 and one or more spacers or standoffs 114 attached to, or formed as a part of, the plate 112. The shield element 104 is designed to be positioned within an emission stream of the emission, and to withstand a corrosive jet of the emission as it is exhausted from the vent port 110 of the failed avionics unit 102, and thus provides a corrosive jet-resistant shield element 104. For example, the shield element is designed to resist corrosive effects from high temperatures, high-speed particles or droplets, and chemicals of the emission to which the shield element can be exposed as the emission is exhausted from the vent port 110 of the avionics unit 102. The shield element 104 can be manufactured from an appropriate metal or synthetic material such as corrosion-resistant steel alloys (e.g., corrosion-resistant steel "CRES"). The standoffs 114 are designed to separate the avionics unit 102 from the shield element 104 to allow the emission to escape from the avionics unit 102 through the vent port 110, for example, so that pressure does not increase within the avionics unit 102 to such an extent that the ULD ruptures or bursts. The standoffs 114 and shield element 104 can include mounting holes 116 therethrough for attachment of the avionics unit 102 as described below. An emission baffle (i.e., an emission suppressor) 120 can be positioned between the avionics unit 102 and the shield element 104 as depicted to baffle or suppress particles and vapors as described in more detail below. A first height of the suppressor 120 can be equal to or greater than a second height of the standoffs 114 so that a seal is formed between a base 121 of the avionics unit 102 and the suppressor 120, and between the shield element 104 and the suppressor 120.

The bracket 106 can include mounting holes (i.e., fastener holes) 122 that facilitate mounting of the avionics unit 102 and the shield element 104 to the bracket 106. The bracket 106 can further include one or more deflectors 124 that define one or more channels 126 to direct the flow of the emission that is exhausted from the avionics unit 102 during failure, for example, away from structures that may be adversely affected by exposure to the emission. Including a deflector 124 on each of four edges of a square or rectangular bracket 106 can deflect emissions back onto the failed avionics unit 102 and away from a surface to which the avionics unit assembly 100 is attached, as well as surfaces located laterally with respect to the avionics unit assembly 100. The bracket 106 can thereby provide a heat shield for the avionics unit 102. The bracket 106 can include adjustable connectors 128 that facilitate attachment of the bracket 106 to other aircraft structures as described below. Suitable materials from which the bracket can be manufactured include, for example, aluminum alloys selected for strength, weight, and suitability for aircraft environments.

The avionics unit 102, shield element 104, and bracket 106 can be mechanically connected together using any sufficient technique. In one implementation, the base 121 of the avionics unit 102 can include holes 130 and the holes 122. The optional suppressor 120, if used, can be positioned between the base 121 of the avionics unit 102 and the shield element 104 as depicted in FIG. 1 (not depicted in FIG. 2 to show other structures). Bolts 132 can be inserted into the holes 130 through the base 121 of the avionics unit 102, into the holes 116 through the standoffs 114 and the shield element 104, into the holes 122 of the bracket 106, and secured from a backside of the bracket 106 using fasteners 200 (FIG. 2) such as nuts 200. Once the structures are attached, the avionics unit 102, the shield element 104, and the bracket 106 are attached and mounted together, each to the other, to form the avionics unit assembly 100. In this implementation, the shield element 104 is positioned directly between, and mounted to, the avionics unit 102 and the bracket 106.

The avionics unit assembly 100 can be attached to an aircraft using the one or more adjustable connectors 128. The adjustable connectors 128 can be or include adjustable mounting fasteners as depicted, a plurality of nuts and bolts, rivets, or another type of adjustable connectors 128.

During a failure of the avionics unit 102, such as an avionics unit 102 as depicted in FIGS. 1 and 2, pressure within the avionics unit 102 increases and an emission is exhausted from the interior of the avionics unit 102 and through the vent port 110 and into an interior area 140 defined, at least in part, by an interior perimeter of the suppressor 120, the plate 112 of the shield element 104, and the base 121 of the avionics unit 102. As pressure builds within the interior area 140, the emission passes through channels of the suppressor 120 and can be filtered as discussed in more detail below. The filtered emission exits the suppressor 120 and enters the channel 126 defined by the bracket 106. The channel 126 can direct the filtered emission away from structures that are susceptible to damage from chemical components, thermal components, particulate components (which are potentially electrically conductive), and/or other components of the emission output from the avionics unit assembly 100 during failure.

Figure 3:
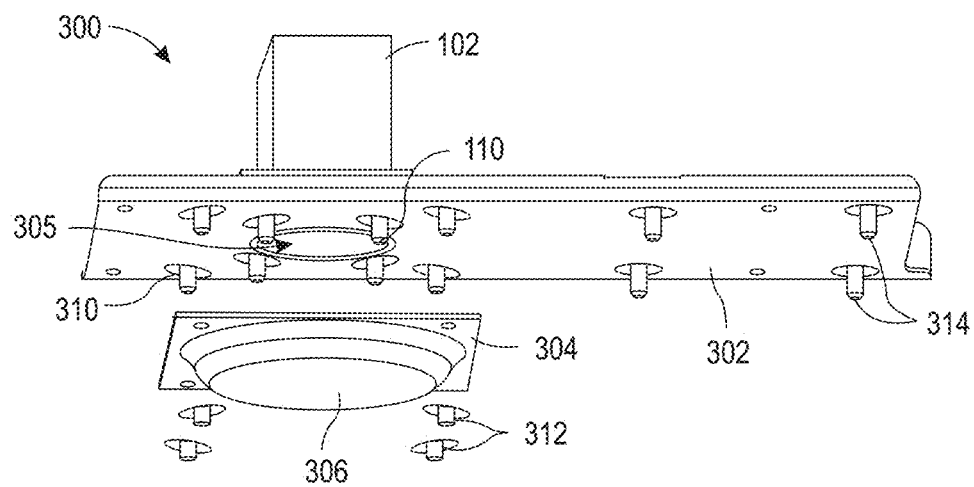
FIG. 3 is an exploded perspective depiction of another implementation of the present teachings.

While FIGS. 1 and 2 depict one configuration of an avionics unit, other configurations are contemplated. For example, FIG. 3 is an exploded perspective depiction of another implementation of an avionics unit assembly 300 including an avionics unit 102 such as an avionics unit 102 as described relative to the implementation of FIGS. 1 and 2, a bracket 302, and a shield element 304. In this implementation, the bracket 302 defines a hole 305 therein through which the emission ejected from the at least one vent port 110 passes during failure of the avionics unit assembly 300. The shield element 304 can include a recess 306 that receives the emission after it is ejected from the vent port 110. Hot particles in the emission can clinch or cling to the shield element such that the shield element 304 provides a filtering function, for example, before the emission enters the suppressor (element 120 in FIG. 1, not depicted in FIG. 3 for simplicity). The avionics unit assembly 300 is thus configured such that, during the failure of the avionics unit 102, the emission passes through the hole 305 defined by the bracket 302 and into the recess 306 to directly impinge on the shield element 304. The shield element 304 can be attached to the bracket 302 using, for example, bolts 310 and nuts 312, or another fastener. Once the structures are attached, the avionics unit 102, the bracket 302, and the shield element 304 are attached and mounted together, each to the other, to form the avionics unit assembly 300. In this implementation, the bracket 302 is positioned directly between, and mounted to, the avionics unit 102 and the shield element 304. The avionics unit assembly 300 can include fasteners 314 that facilitate attachment of the bracket 302 and thus the avionics unit assembly 300 to other aircraft structures. The fasteners 314 can be or include bolts as depicted, adjustable connectors 128 as depicted in FIG. 1, or another type of fastener.

Figure 4:
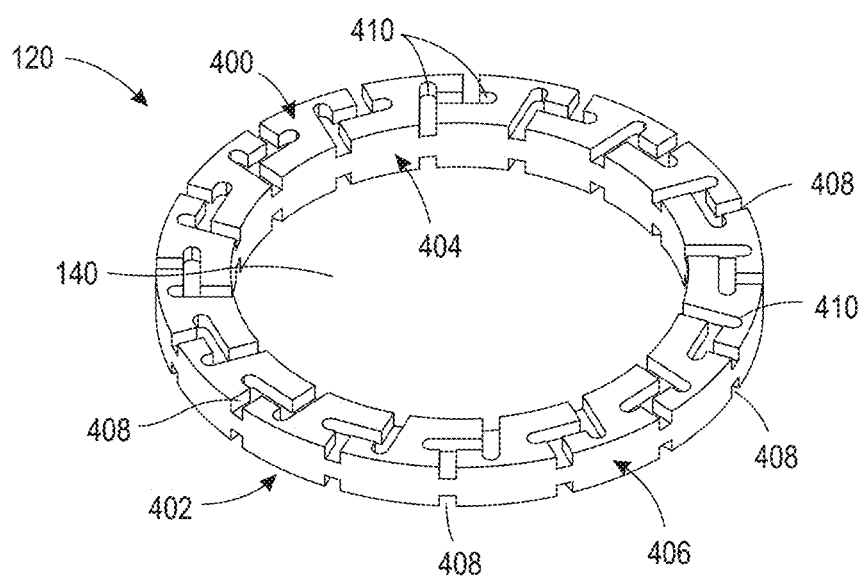
FIG. 4 is a perspective depiction of a suppressor in accordance with an implementation of the present teachings.

FIG. 4 is a perspective depiction of a suppressor 120 in accordance with an example implementation of the present teachings. The suppressor 120 includes a first surface 400, a second surface 402 opposite the first surface 400, a third surface 404 extending from the first surface 400 to the second surface 402 that provides an internal or interior perimeter of the FIG. 4 suppressor 120, and a fourth surface 406 of the suppressor 120 extending from the first surface 400 to the second surface 402 that provides an external or exterior perimeter of the of the FIG. 4 suppressor 120. The suppressor 120 defines a plurality of channels 408 that extend from the third surface 404 to the fourth surface 406. The channels 408 thus provide a pathway for the emission from the interior area 140 (depicted in FIG. 1) to an exterior 150 of the avionics unit assembly 100, 300, where the interior area 140 is defined, at least in part, by the third surface 404 of the suppressor 120. The channels 408 can be formed in only one of the first surface 400 and the second surface 402, or both of the first surface 400 and the second surface. In some implementations, the channels 408 can extend from the first surface 400 to the second surface 402.

Figure 5:
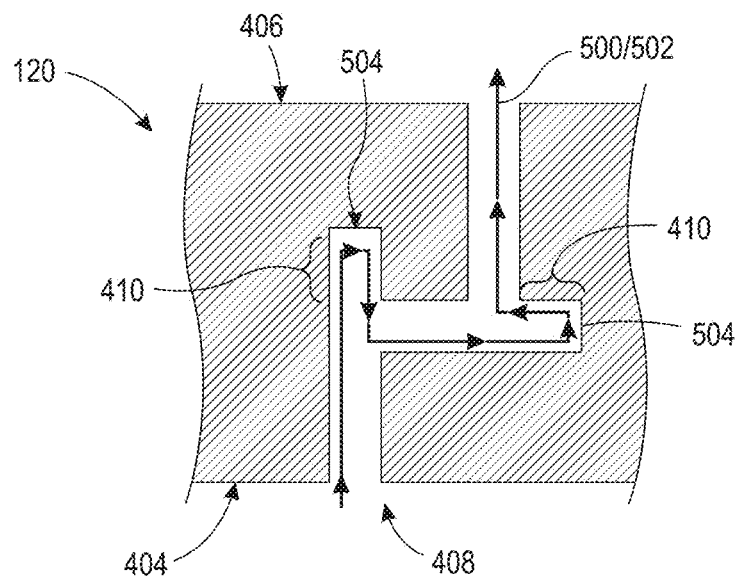
FIG. 5 is a magnified plan schematic view of a portion of the suppressor of FIG. 4.

As depicted in the perspective depiction of FIG. 4 and the plan view detail of FIG. 5, the plurality of channels 408 can be formed to provide a plurality of tortuous paths 500 from the third surface 404 to the fourth surface 406 through which the emission 502 traverses as it is expelled or ejected from the suppressor 120. As depicted in FIGS. 4 and 5, the tortuous path 500 of each channel 408 can include at least one blind alley 410. In FIGS. 4 and 5, each channel 408 includes two blind alleys 410, although it is contemplated that each channel 408 can include only one blind alley or more than two blind alleys 410. For purposes of this description, a "blind alley" includes a channel portion where, upon entry of the emission 502 from a failing avionics unit into the blind alley, the emission 502 must reverse direction as depicted in FIG. 5 to continue through the channel 408 to exit the interior perimeter of the suppressor 120 to the exterior 150 of the avionics unit assembly 100, 300.

When the avionics unit is assembled using the suppressor 120, the first surface 400 can physically contact an adjacent structure such as the avionics unit 102. Further, the second surface 402 can physically contact an adjacent structure such as the shield element 104 (FIG. 1) or the bracket 302 (FIG. 3). To provide an airtight or leakage-resistant seal with adjacent structures, the suppressor 120 can be formed from a flexible or compliant material such as silicone, polyethylene or another polymer, or a non-rigid or plastic. In an example implementation, the suppressor 120 can be manufactured from a single piece of molded material.

In addition to providing a seal with adjacent structures, these flexible or compliant materials may provide a filtering component to the suppressor 120. During failure of the avionics unit, gaseous components, liquid components, and/or particulate components (e.g., metal particles, carbon particles) of the emission 502 can have a relatively high first temperature. In contrast, the flexible or compliant material of the suppressor 120 may soften and/or melt at a second temperature which is lower than the first temperature. As the emission 502 moves through the channels 408, the relatively higher temperature emission 502 softens and/or melts the material of the suppressor 120. As depicted in FIG. 5, the particulate components 504 within emission 502 can be forced against walls that define the channel and can thereby become embedded into the suppressor 120 and removed from the emission 502. Thus, rather than being ejected from the failing avionics unit, the momentum of the particulate components 504 and the walls of the channels 408 that are softened from the heat of the emission 502 cause the particulate components 504 to be suspended within the suppressor 120. The suppressor 120 is thereby configured to capture at least one of the liquid component and the particulate component of the emission.

In another implementation, the suppressor 120 can be formed from a rigid material with a melting temperature that is higher than the temperature of the gaseous components and/or particulate components of the emission. Suitable materials include a rigid plastic, nylon, corrosion-resistant steel (e.g., CRES), etc. During failure of the avionics unit, the suppressor 120 remains rigid when exposed to the emission. In this implementation, the particulate components 504 of the emission 502 physically impact the walls that define the channels 408, particularly at the end of the blind alleys 410. As a result of the physical contact between the suppressor 120 and the particulate components 504, the particulate components 504 can shatter into smaller particles, effectively converting them to gaseous components of the emission. The smaller particles may burn and vaporize, or otherwise have a decreased risk of causing combustion of aircraft structures when they are expelled or ejected from the avionics unit compared to the ejection of larger particles. Thus, rather than being ejected from the failing avionics unit as relatively larger particles, the momentum causes the particulate components 504 to impact the walls of the channels 408 with a sufficient force to break them into smaller particles, which then become part of the gaseous component of the emission 502.

With regard to placement of the avionics unit assembly 100, 300 within the aircraft, as discussed above, ULB's and ULD's have heretofore been positioned within the environmentally controlled aircraft pressure vessel (fuselage or cabin space) of the aircraft. In general, devices are placed within this environmentally controlled space to mitigate problems that might otherwise occur from exposure to high and low temperature extremes, low air pressure, and high humidity/moisture unless the equipment's function requires the equipment requires it to be placed outside. For example, a weather radar must transmit and receive radar signals and must therefore be placed outside the fuselage, for example, under the radome. Moreover, a beacon light must be visible to other aircraft, and thus must be placed outside the fuselage. This general rule is driven by the more benign environments within the fuselage as discussed above, as well as the ability to use dedicated and accessible rack and mounting spaces and to reduce the number of penetrations through the fuselage.

In addition to the environmental and installation mounting challenges of an outside the pressure vessel installation, installations of equipment exterior to the fuselage, for example, on the aircraft forward pressure bulkhead (hereinafter, "forward bulkhead") under the radome outside the pressure vessel are avoided because of various other factors. For example, referring to the side view of FIG. 6, equipment mounted to the forward bulkhead 602 of an aircraft 600 under the radome 604 are in very close proximity to multiple critical Radio Frequency (RF) systems such as a weather radar antenna of the weather radar, one or more localizer (LOC) antennas (hereinafter, "localizer antenna"), and one or more instrument landing system (ILS) glide slope (GS) antennas (hereinafter, "ILS antenna"). As a result of these multiple integration challenges, electronic equipment, except for ILS systems requiring a forward view for radio frequency or optical apertures, has not been mounted on the commercial passenger aircraft 600 outside the pressure vessel 606 (fuselage or cabin space), particularly on the forward bulkhead 602 of the aircraft 600 under the radome 604.

Figure 6:
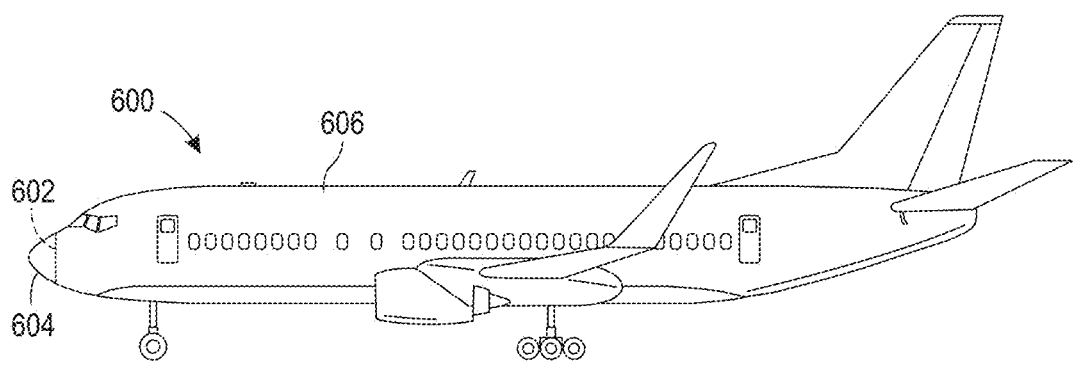
FIG. 6 is a side view of an aircraft including an avionics unit in accordance with an implementation of the present teachings.
Figure 7:
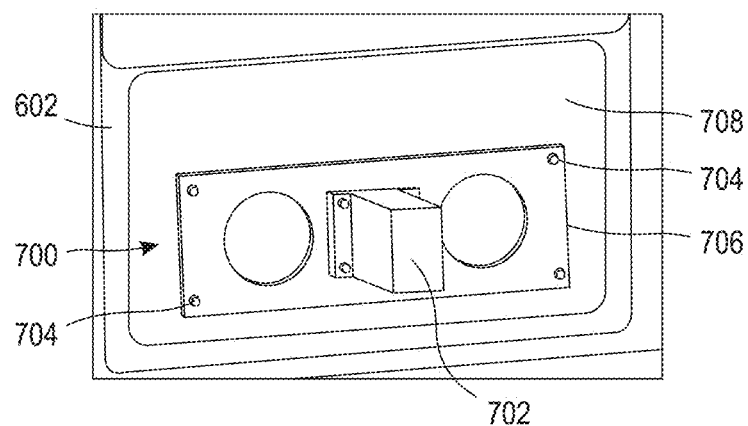
FIG. 7 is a perspective depiction of an avionics unit attached to a surface in accordance with an implementation of the present teachings.
Figure 8:
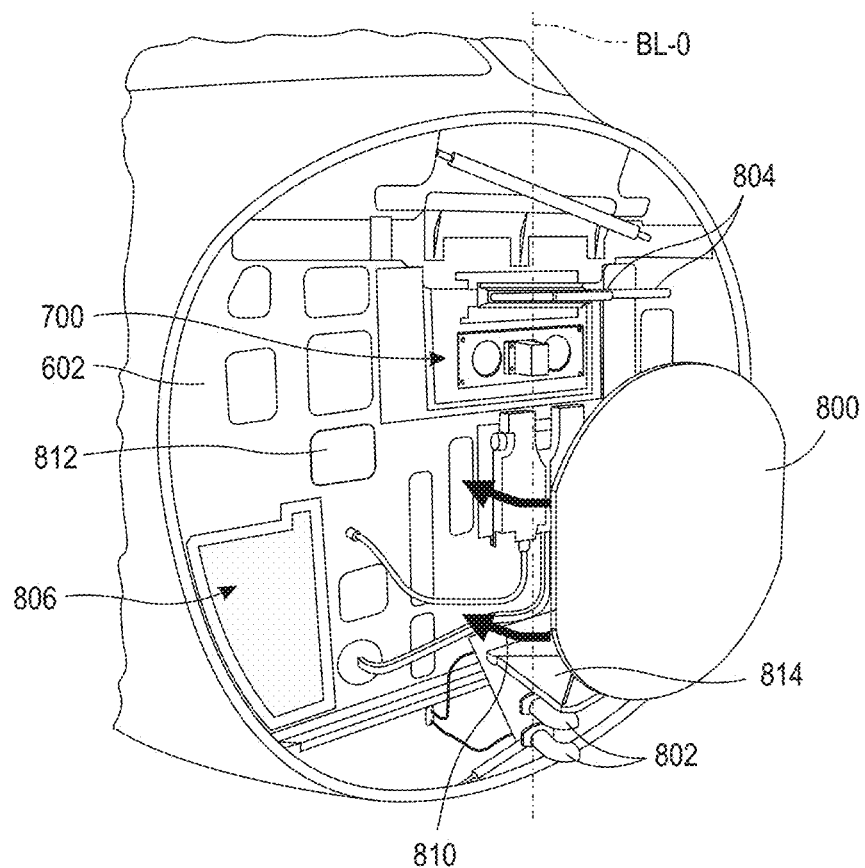
FIG. 8 is a wide view of the FIG. 7 device installed on a surface of an aircraft.

FIGS. 7 and 8 are perspective views of an avionics unit assembly 700 attached to a surface such as the forward bulkhead 602 of an aircraft 600 (FIG. 6). In the FIG. 8 depiction, the radome 604 of FIG. 6 has been removed to reveal the forward bulkhead 602. The avionics unit assembly 700 can be or include one of the avionics unit assemblies 100, 300 and the avionics unit 102 of FIGS. 1 and 3, or a different avionics unit. In FIG. 7, the avionics unit assembly 700 is attached to the forward bulkhead 602 using bolts 704 within holes through the bracket 706 and a panel 708 of the forward bulkhead 602, although other attachment techniques are contemplated.

The FIG. 8 view depicts the forward bulkhead 602 with various other structures attached thereto. These structure can include, for example, a weather radar antenna 800 of the weather radar, one or more localizer antennas 802, and one or more ILS antennas 804. Line BL 0 represents buttock line 0 of the aircraft 600, where BL 0 represents the geometric plane along the longitudinal centerline of the aircraft 600. It will be appreciated that an actual structure can include other components that have not been depicted for simplicity, while various depicted structures can be removed or modified.

Forward bulkhead installation in aircraft requires that the installed avionics unit 102, as integrated into an installed avionics unit assembly 700, does not result in significant impact to the RF performance of the critical ILS and surveillance systems installed on the forward bulkhead 602, including the weather radar antenna 800, the localizer antenna 802, and the ILS antenna 804. Two potential sources of impact to the RF performance of the ILS must be addressed for the installed avionics unit assembly 700. These sources include interference due to RF emissions by the avionics unit 102, and impact to ILS antenna performance due to changes in the local electromagnetic field characteristics and antenna patterns, including RF reflections and diffractions due to the presence of the electrically conductive body and structure of the installed avionics unit assembly 700. Critical impacts to antenna pattern performance that should be considered include changes in antenna cross polarization performance and antenna voltage standing wave ratio (VSWR) performance.

A further set of RF integration considerations apply to the positioning the installed avionics unit assembly 700, with respect to the weather radar antenna 800. The installed avionics unit assembly 700 should be placed behind the weather radar antenna 800 to ensure that RF performance is not affected. Additionally, the installed avionics unit assembly 700 should be placed outside of the volume potentially swept by the gimballing of the weather radar antenna 800 (or outside of the swept volume) to ensure that there is no mechanical interference with the weather radar antenna 800 operations.

To control RF emissions by the avionics unit 102 so that the RF emissions are at or below acceptable levels, one or more of several methods can be applied. The avionics unit 102 itself can be designed to minimize RF emissions in frequencies of concern through electronic design techniques (e.g., printed wiring board and component bonding, shielding, grounding, layout and other design approaches), avionics unit level packaging design techniques, for example use of electrically enclosed structure that provides a "Faraday cage" through which select frequencies cannot propagate, well bonded and grounded electrical connections, and/or other similar or related techniques. Unit operational design aspects can also be used to address radiated emissions impacts, for example, placing the unit in an operationally inert, low RF radiation state during operations where the nearby ILS antenna and weather radar antenna are or might be in use.

At the level of the installed avionics unit assembly 700, RF emissions can be controlled by one or more of several techniques. In one technique, an avionics unit 102 that emits low levels of emissions within the range of critical frequencies can be used. In another approach, the ILS antenna 804 can be shielded or shadowed from direct line-of-sight emissions from the avionics unit 102 using an electrically conductive shielding. For example, as depicted in FIG. 8, the localizer antenna 802 is shielded from line-of-sight transmissions from the installed avionics unit 702 by the weather radar system including the weather radar antenna 800. In this specific example, the ILS antenna 804 does not have the benefit of shielding or shadowing from the installed avionics unit 702. An approach is to include a structure providing a Faraday cage to the installed avionics unit assembly 700 to enclose the avionics unit 102. This Faraday cage structure would be electrically grounded, any openings sufficiently small with respect to the ILS and weather radar wave lengths so that no radiated emission in the ILS and weather radar frequencies radiated by the avionics unit 102 would exit the installed avionics unit assembly 700. One, two or more, or all of the design techniques described above can be applied to achieve sufficiently low levels of RF emission impact from the avionics unit 102 within the critical frequencies that might affect other systems positioned nearby, such as under the radome 604.

Methods to control potential operational impacts to ILS antenna performance by the electrically conductive body and structure of the installed avionics unit assembly 700 are contemplated. These methods include sizing, positioning, and electrical grounding of the avionics unit 102.

It is further contemplated that the presence of the avionics unit 102 on the forward bulkhead 602 can adversely increase cross polarization for the localizer antenna 802 and, particularly, the ILS antenna 804. This cross polarization level may vary from the motion of the weather radar antenna 800. The cross polarization levels will rise and fall depending on the physical location of the weather radar antenna 800 during operation. If the local landing field does not have sufficient polarization control of its ILS signals, the aircraft can receive incorrect ILS guidance data part of the time as the weather radar antenna 800 sweeps back and forth. To mitigate ILS antenna 804 pattern cross polarization issues, the avionics unit 102 should be electrically small and should be placed strategically, as described above.

For the purposes of this installation approach, "electrically small" is defined as having avionics unit linear dimensions (i.e., one, two, or all three of a height, a length, and a width) that are less than about $1/8^{th}$, or less than about $1/12^{th}$, of a radio frequency signal wavelength that is output and/or received by the localizer antenna 802, the ILS antenna 804, or other structures of concern that output and/or receive a radio frequency signal having a wavelength. In particular, the dimensions that result in an "electrically small" range of the avionics unit 102 are those dimensions that are aligned with the lateral or horizontal axis of the localizer antenna 802 and/or ILS antenna 804 although, for a conservative approach, all of the linear dimensions should be electrically small. Radio frequency dimensions for the localizer antenna 802 and ILS antenna 804 are in the relatively small range of approximately 3 to 4 inches. It should be noted that these considerations do not apply to integration of the avionics unit 102 with the weather radar antenna 800.

Various placement locations of the avionics unit assembly 700 within the aircraft to control the potential impacts to ILS antenna 804 performance due to the presence of the electrically conductive body are contemplated. For the tracking functions supported by the ILS glide slope and localizer antennas 802 installed on butt line zero (BL 0), symmetric installations positioned along BL 0 as depicted in FIG. 8, along with the use of a symmetric avionics unit 102 as depicted in FIG. 1, will minimize potential asymmetric impacts to ILS antenna 804 patterns and tracking performance.

Figure 16:
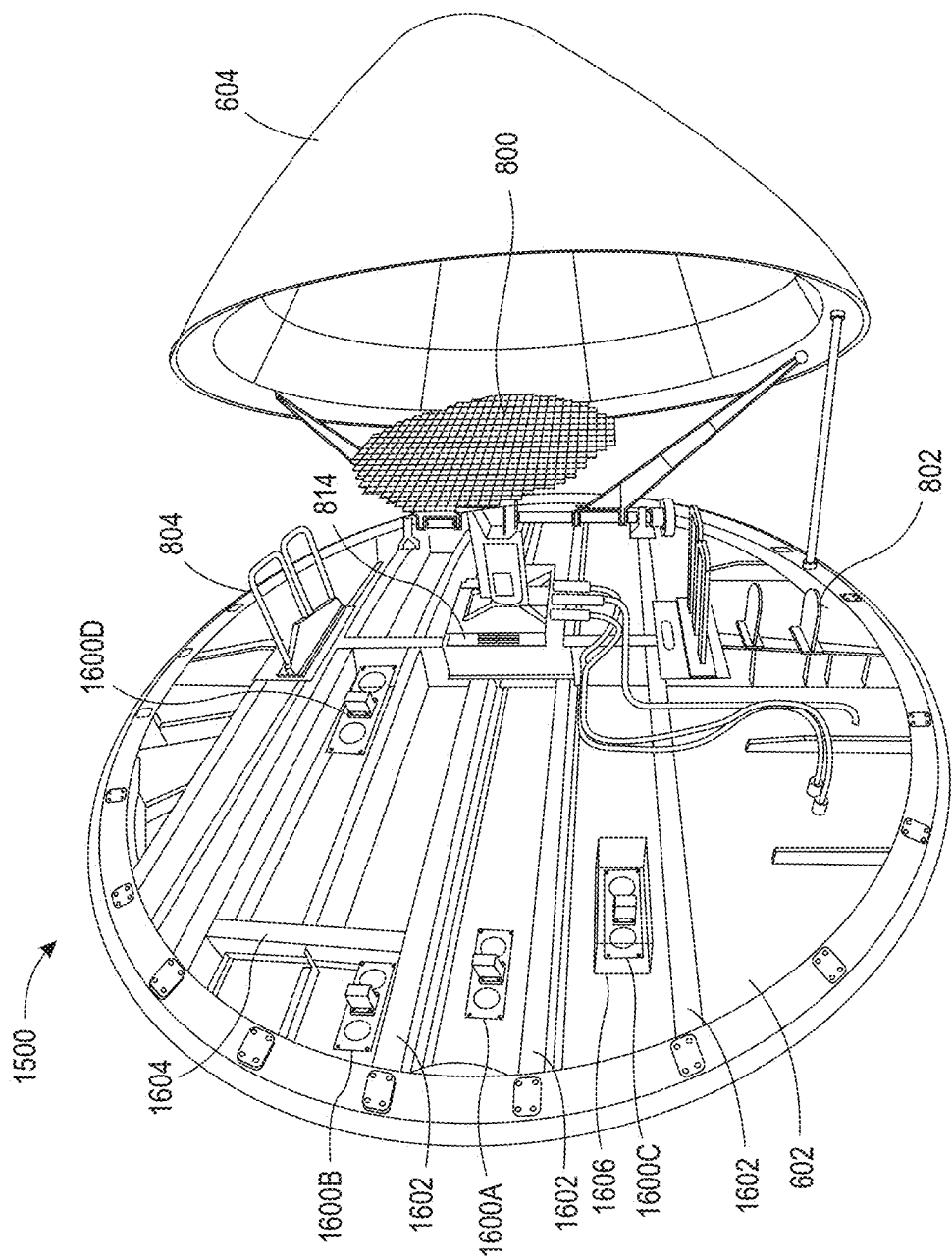
FIG. 16 is a perspective view depicting various aviation unit assemblies attached to a bulkhead of an aircraft, wherein a radio frequency output of each aviation unit assembly is shielded from other electronic equipment installed under a radome of the aircraft.

As with mitigating radiated emissions from the avionics unit 102, ensuring that the ILS antennas 804 are shielded or shadowed by electrically conductive structures from direct line of sight to the avionics unit 102 is also an approach that will reduce the impact on the local electromagnetic field and antenna patterns for the ILS antenna 804. The avionics unit 102, can be positioned such that it is completely shielded by (i.e., shadowed by) existing aircraft structure from the ILS antennas 804 (e.g., from an electromagnetic field generated by, and/or surrounding, the ILS antennas 804). The existing aircraft structures can include, for example, a pedestal 814 of the weather radar antenna 800 that shields the avionics unit 102 from the localizer antenna 802 that is positioned on the opposite side of pedestal 814. The existing aircraft structure can also include structural lattice elements such as I-beam structures (e.g., vertical beams and/or horizontal beams) used for some forward bulkhead structures. Further, additional structure can be installed to reduce or prevent electronic interference of the avionics unit 102 on other electronic equipment that is installed under the radome 604. FIG. 16 depicts various techniques for shielding and/or shadowing various electronic systems such as the localizer antenna 802 and the ILS antenna 804 from one or more avionics unit assemblies 1600A-1600D according to an implementation of the present teachings. RF output from avionics unit assembly 1600A is at least partially shielded using one or more horizontal I-beams 1602 that form at least a portion of the forward bulkhead 602. RF output from avionics unit assembly 1600B is at least partially shielded using one or more vertical I-beams 1604. RF output from avionics unit assembly 1600C is at least partially shielded using an electrically grounded Faraday cage 1606. RF output from avionics unit assembly 1600D is at least partially shielded, for example from localizer antenna 802, using other electronic device subsystems, such as the pedestal 814 of the weather radar antenna 800.

In one alternative to positioning the avionics unit 702 along the plane of BL 0 for BL 0-mounted ILS antennas 804, the avionics unit 702 can be electrically isolated from the forward bulkhead 602 using, for example, one or more electrically insulated fasteners. If the avionics unit 702 is electrically isolated from the forward bulkhead 602 and other aircraft structures, and the avionics unit 702 can be sufficiently spaced away from the ILS antennas 804, the avionics unit 702 can be positioned away from the longitudinal, geometric, or bilateral centerline of the aircraft (i.e., away from, or off of, the aircraft plane BL 0), and away from the centerline of the ILS antenna 804. Further, if the avionics unit 702 is electrically isolated from the forward bulkhead 602 and other aircraft structures, the avionics unit 702 can be positioned asymmetrically with respect to the mounts of the ILS antenna 804 with minimal pattern impact to the ILS antenna 804. This gives greater flexibility in positioning of the avionics unit 702 while reducing electrical or RF interference by the avionics unit 702 with other electronic structures positioned between the radome 604 and the forward bulkhead 602.

In an implementation of the present teachings, as depicted in FIGS. 6 and 8, the avionics unit 702 can be positioned directly between the radome 604 and the forward bulkhead 602 in a direction perpendicular to a major plane 806 of the forward bulkhead 602. Further, the avionics unit 702 can be positioned at least partially within BL 0 of the aircraft 600 with the avionics unit 102 positioned along BL 0. Additionally, in a direction perpendicular to the major plane 806 of the forward bulkhead 602, at least a portion of the avionics unit 702 can be positioned directly between the forward bulkhead 602 and the weather radar antenna 800, and outside of the weather radar antenna 800 swept volume 810 to prevent interference with the operation of the weather radar antenna 800. Further, the avionics unit should be positioned to allow access to any equipment maintenance ports 812 without requiring disassembly and/or removal of other structures positioned adjacent to the radome 604 between the radome 604 and the forward bulkhead 602.

Figure 9:
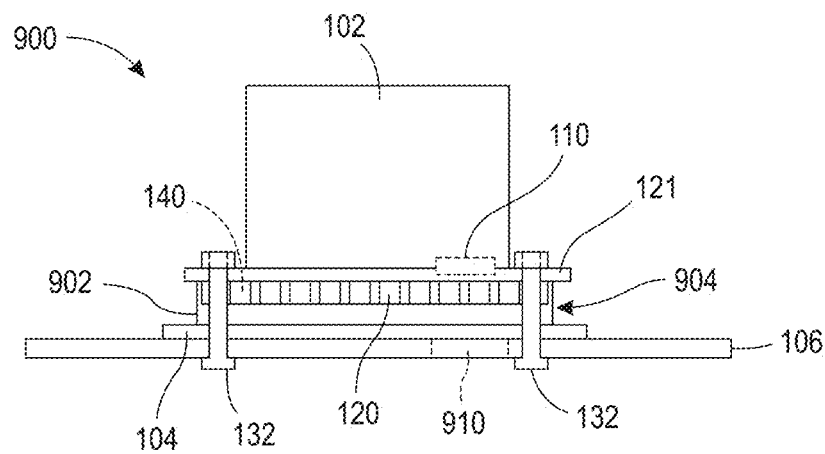
FIG. 9 is a side view of an avionics unit according to another implementation of the present teachings.

It will be appreciated that various other implementations of the present teachings are contemplated. FIG. 9 is a side view depicting an avionics unit assembly 900 including an avionics unit 102, a suppressor 120, a shield element 104, and a bracket 106. This implementation further includes an optional particle or spark emission shroud 902 that is configured to receive, contain, and/or capture, temporarily or permanently, the emission from the failing avionics unit 102 prior to exiting the avionics unit assembly 900 through the suppressor 120. Either or both of the emission shroud 902 and the suppressor 120 can, for example, collect one or more of a liquid component and a hot, burning, and/or electrically conductive particulate component of the emission prior to the gaseous component of the emission exiting the avionics unit through the suppressor 120. The emission shroud 902 can provide one or more of several potential functions in the assembly. The emission shroud 902 can, for example, provide contained stand-off spacing between the avionics unit 102 and the shield element 104 and, in some implementations, between the avionics unit 1108 and the suppressor 1302 (FIG. 13), thereby allowing some dissipation of the failure pressure, jet energy, and impact focus of the emission. Further, the emission shroud 902 can providing a contained structural transition or an adapter element between the avionics unit 102, the shield element 104, and the suppressor 120. Additionally, the emission shroud 902 can provide contained spacing of the emission between the attachment to the avionics unit 102. Furthermore, the emission shroud 902 can provide a baffle function itself through the use of closely fit but not hermetically sealed baffle side or end structures that would allow gases to escape while obstructing the escape of particles and droplets. In this instance, varying the height of the emission shroud provides a technique to adjust the design to increase or decrease a volume of a gas or emission release area. The emission shroud 902 can have a ring shape, for example, a circular, oval, square, rectangular, etc. ring shape, that defines an opening through the emission shroud 902. The emission shroud 902 can have an inner perimeter 1022 (FIG. 10) and outer perimeter 904, where each perimeter defines a shape such as a circle, oval, square, rectangle, etc. The avionics unit assembly 900 of FIG. 9 can optionally omit the suppressor 120, for example, if an internal volume of the emission shroud 902 is sufficient to contain the emission during a failure of the avionics unit assembly 900. The internal volume of the emission shroud 902 can be varied by increasing or decreasing a height or internal perimeter of the emission shroud 902. In this implementation, the shield element 104 is positioned between the bracket 106 and the emission shroud 902, and the suppressor 120 is positioned between the avionics unit 102 and the emission shroud 902. It will be appreciated that the positions of the emission shroud 902 and the suppressor 120 can be reversed. In another implementation, the bracket 106 of FIG. 9 can be positioned between the avionics unit 102 and the suppressor 120, where the bracket 106 includes a hole 910 therethrough that provides a passageway for the flow of emission from the vent port 110, through the hole 910, into the emission shroud 902, and out of the avionics unit assembly 900 through the suppressor 120.

Figure 10:
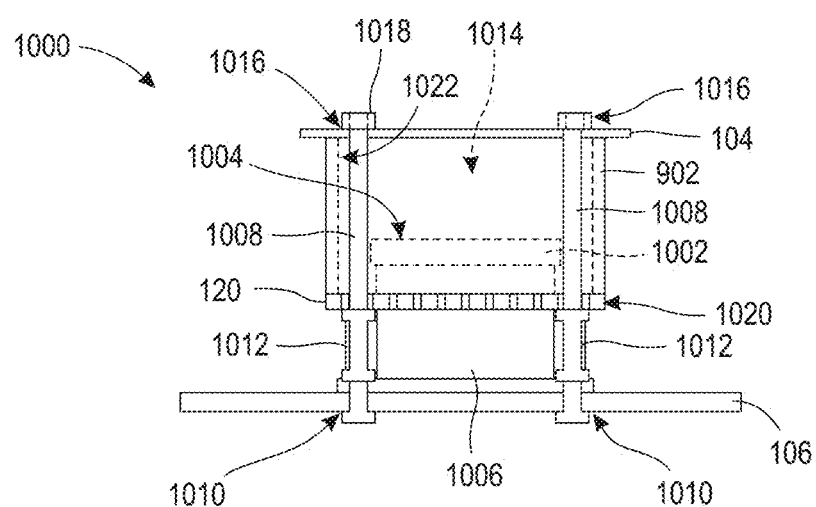
FIG. 10 is a side view of an avionics unit according to another implementation of the present teachings.

In some implementations, the vent port may be provided on a surface of the avionics unit 102 that is opposite to the bracket. For example, FIG. 10 is a side view of an avionics unit assembly 1000 where the vent port is provided by a detachable end cap 1002 positioned at an upper surface 1004 of the avionics unit 1006 such as a LF-ULD. In this implementation, the end cap 1002 is configured to detach from a body 1007 of the avionics unit 1006. For example, the end cap 1002 can be friction fit, adhered to the body 1007 with an adhesive, or otherwise secured to the body 1007 such that, when a pressure within the avionics unit 1006 reaches a threshold, the end cap 1002 dislodges or is otherwise detached from the body 1007, thereby providing the vent port through an end of the body 1007. Further, the emission shroud 902 is positioned between the shield element 104 and the suppressor 120, and the suppressor 120 is positioned between the emission shroud 902 and the bracket 106. The avionics unit assembly 1000 can be assembled by placing one or more bolts 1008 through one or more holes 1010 in the bracket 106, through one or more spacers or standoffs 1012, through the interior area 140 (FIG. 1) of the suppressor 120, through an interior 1014 of the emission shroud 902, through one or more holes 1016 in the shield element 104, and secured with fasteners 1018 such as nuts or other fasteners 1018. Each standoff 1012 can include a platform 1020 upon which the suppressor 120 rests. The suppressor 120 can be manufactured such that an internal perimeter is sized for the outer perimeter of the avionics unit 1006 such that a seal can be established directly between the avionics unit 1006 and the particle/vapor suppressor 120. Upon failure of the avionics unit assembly 1000, the emission can exit the avionics unit 1006 through the end of the body 1007 and enter the interior 1014 of the emission shroud 902.

The emission can exit the avionics unit assembly 1000 through the suppressor 120 as described above. Further, the end cap 1002 can be captured by, and contained within, the emission shroud 902 of the avionics unit assembly 1000.

Figure 11:
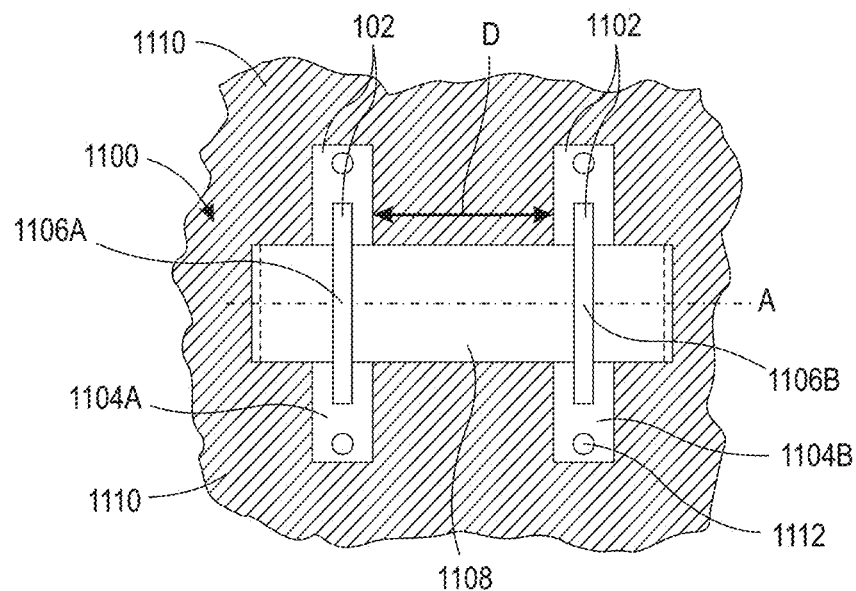
FIG. 11 is a plan view of an avionics unit attached to a surface according to another implementation of the present teachings.
Figure 12:
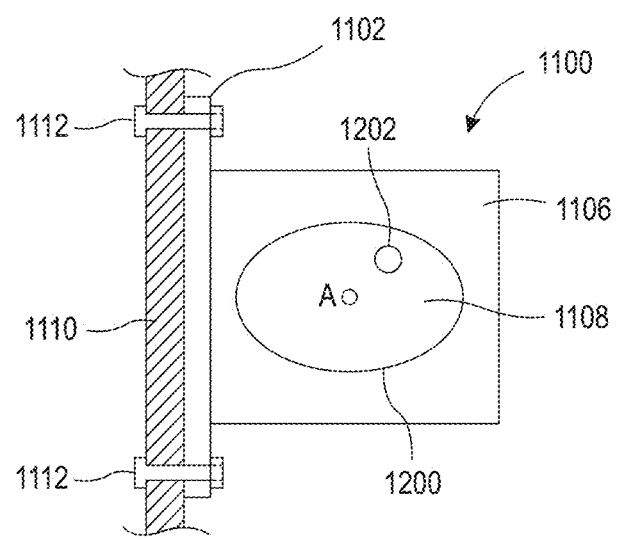
FIG. 12 is a side view of the FIG. 11 device and surface.

FIG. 11 is a front view, and FIG. 12 is a side view, of an avionics unit assembly 1100 according to another implementation of the present teachings. This implementation includes a bracket 1102 having a first plate 1104A and at least a second plate 1104B. The first plate 1104A has a first mounting arm 1106A extending therefrom, and the second plate 1104B has a second mounting arm 1106B extending therefrom. Each mounting arm 1106 defines a hole 1200 for receiving and securing an avionics unit 1108 such as an LF-ULD to a surface 1110 such as a forward bulkhead 602 as described above.

The holes 1200 may have a size and shape that approximates a size and shape of the outer perimeter of the avionics unit 1108 along the direction of the longitudinal axis A. The avionics unit 1108 can be friction fit within the holes 1200, or the device can be secured within the holes 1200 using a compressed seal, adhesive, lock nuts, or another fastener to securely attach the avionics unit 1108. In this implementation, the avionics unit 1108 has a longitudinal axis "A" that, when the avionics unit 1108 is secured to the surface 1110, the axis A is approximately parallel to a major plane of the surface 1110. The bracket 1102 can be secured to the surface 1110 using, for example, bolts and nuts 1112 or another suitable fastener. One or both lateral ends of the avionics unit 1108 can include a vent port 1202 as described above for venting the emission during failure of the avionics unit 1108.

In the implementation of FIGS. 11 and 12, the avionics unit 1108 can be removed from the bracket 1102 by sliding the avionics unit 1108 along the longitudinal axis A, for example, to service or replace the avionics unit 1108, which may be required as the serviceable life of the battery 108 (FIG. 1) and/or avionics unit 1108 approaches its expiration.

Figure 13:
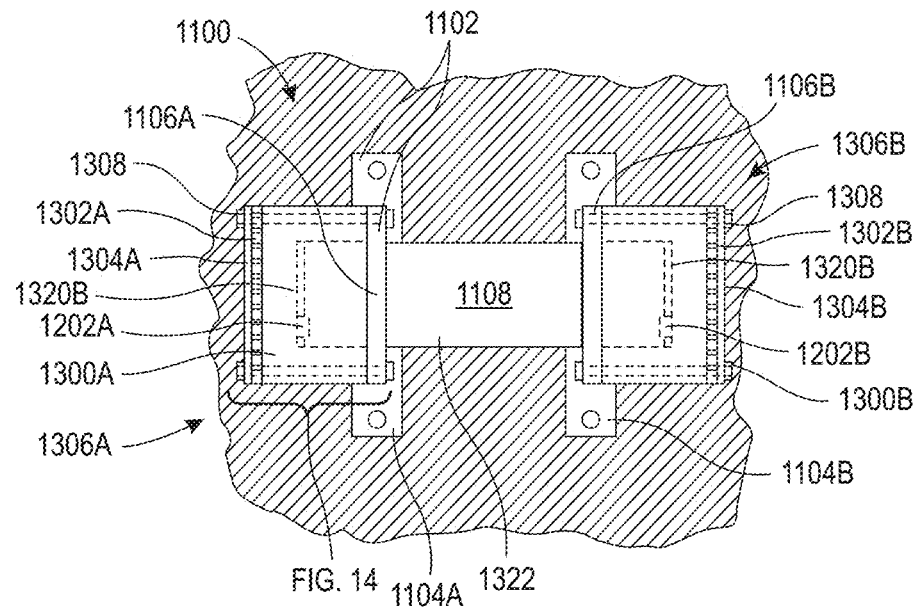
FIG. 13 is a plan view of an avionics unit attached to a surface according to an implementation of the present teachings.
Figure 14:
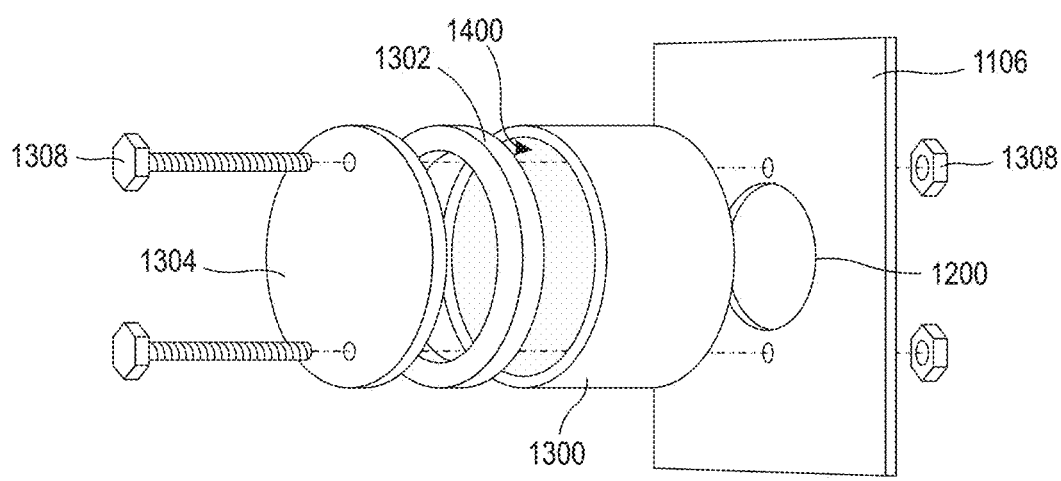
FIG. 14 is an exploded depiction of a portion of the FIG. 13 avionics unit showing build-up of the failure containment structure.

FIG. 13 depicts the avionics unit assembly 1100 of FIGS. 11 and 12, further including a first emission shroud 1300A, a first suppressor 1302A, and a first shield element 1304A positioned at a first end 1306A of the avionics unit 1108 and attached to the first mounting arm 1106A of the bracket 1102. FIG. 13 further depicts a second emission shroud 1300B, a second suppressor 1302B, and a second shield element 1304B positioned at a second end 1306B of the avionics unit 1108 and attached to the second mounting arm 1106B of the bracket 1102. In this implementation, both the first end 1306A and the second end 1306B of the avionics unit 1108 includes a vent port 1202, although it is contemplated that the avionics unit 1108 includes a vent port 1202 at only one end of the device, and thus includes only one emission shroud 1300, one suppressor 1302, and one shield element 1304 that contains the emission from the vent port 1202. The first emission shroud 1300A, the first suppressor 1302A and the first shield element 1304A are secured to the first mounting arm 1106A using a fastener 1308 such as bolts and nuts as depicted, for example, in the perspective depiction of FIG. 14, or using another suitable fastener. The structures at the second end 1306B can be assembled in like fashion. As depicted in FIG. 14, the emission shroud 1300 in this and other implementations, defines a receptacle 1400 that, at least temporarily, receives the emission during a failure of the avionics unit.

During a failure of the avionics unit of FIG. 13, the emission from the failing avionics unit 1108 exits one or both vent ports 1202, enters the emission shroud 1300, and exits the suppressor 1302 through, for example, channels 408 (FIG. 4).

It will be appreciated that the suppressors 1302A, 1302B can optionally be omitted from the assembly of FIG. 13, for example, if an internal volume of the emission shrouds 1300A, 1300B is sufficient to contain the emission during a failure of the avionics unit 1108. It will be further appreciated that the structure of FIG. 13 can include at least a detachable first end cap 1320A and can also include a detachable second end cap 1320B attached to a body 1322 of the avionics unit 1108. The one or more end caps 1320 can be used to provide the one or more vent ports 1202 as described above relative to the implementation of FIG. 2.

In the implementation of FIGS. 11, 12, and 13, a distance "D" (FIG. 11) between the first plate 1104A and the second plate 1104B can be adjusted along the axis A of the avionics unit 1108 to conform to a length of the avionics unit 1108. Further, the first mounting arm 1106A and the second mounting arm 1106B can be positioned at any workable position along the longitudinal axis A of the avionics unit 1108.

Figure 15:
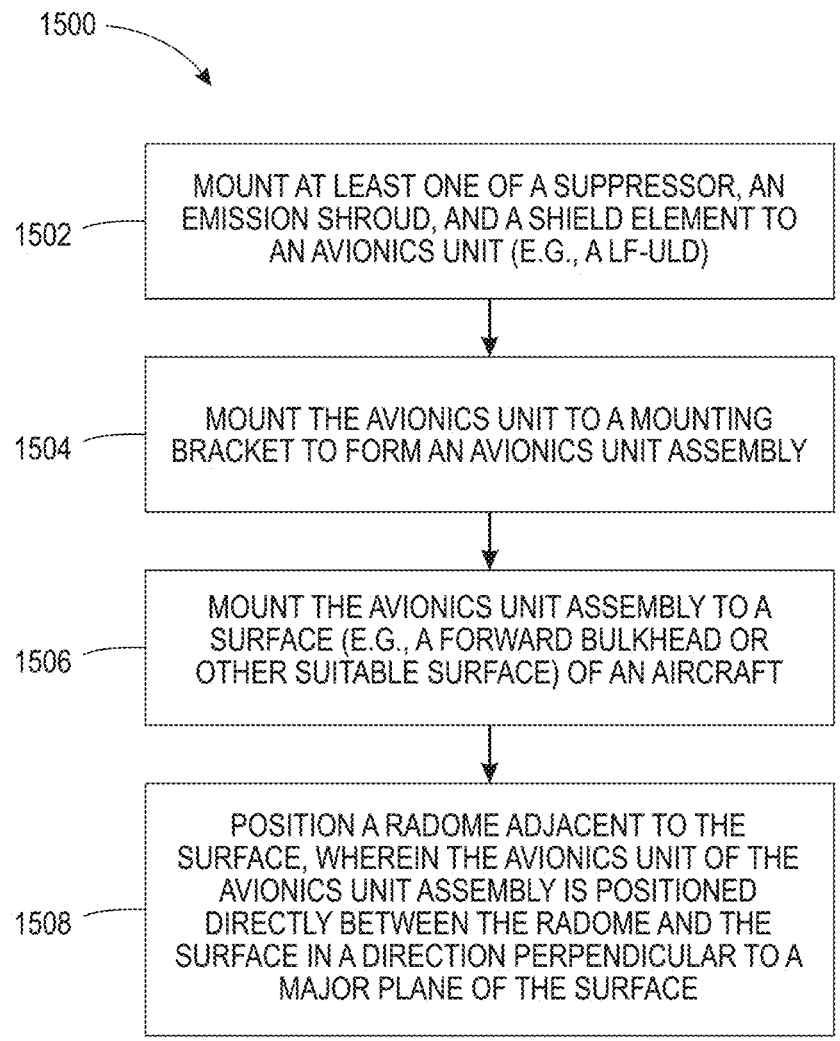
FIG. 15 is a flow chart depicting a method in accordance with an implementation of the present teachings.

FIG. 15 is a flow chart depicting a method 1500 for manufacturing an aircraft 600 according to an implementation of the present teachings. The method 1500 can proceed by operation or use of one or more of the structures depicted in the figures described above, and thus is described with reference to one or more of FIGS. 1-14; however, it will be appreciated that the method 1500 is not limited to any particular structure or use unless expressly stated herein. It will be appreciated that while the method 1500 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been shown for simplicity, while other illustrated acts or events can be removed or modified. For example, sub-methods described by the method 1500 for forming an aircraft of FIG. 15 can be used separately to form an avionics unit itself, separate from the method for forming an aircraft.

The method 1500 for manufacturing an aircraft 600 can begin by assembling at least one of a suppressor 120, 1302, an emission shroud 902, 1300, and a shield element 104, 304, 1304 to an avionics unit 102, 1006, 1108, such as an LF-ULD as at 1502. The avionics unit 102, 1006, 1108 can further be mounted to a mounting bracket 106, 302, 706, 1102 to form an avionics unit assembly 100, 300, 700, 900, 1000, 1100. The avionics unit assembly 100, 300, 700, 900, 1000, 1100 can be mounted to a surface 602, 1110 such as a forward bulkhead 602 or other surface of the aircraft 600 as at 1506. A radome 604 of the aircraft 600 can be positioned adjacent to the surface, as at 1508. The avionics unit 102, 1006, 1108 of the avionics unit assembly 100, 300, 700, 900, 1000, 1100 can be positioned directly between the radome 604 and the surface 602 in a direction perpendicular to a major plane of the surface 602. The positioning of the avionics unit assembly 100, 300, 700, 900, 1000, 1100 can include positioning the avionics unit 102, 1006, 1108 along BL 0 of the aircraft 600. The positioning of the avionics unit 102, 1006, 1108 can further include positioning the avionics unit 102, 1006, 1108 directly between the surface 602 and a weather radar antenna 800 of the aircraft 600. Thus, in a direction perpendicular to the major plane of the surface 602, the avionics unit 102, 1006, 1108 and the weather radar antenna 800 can be positioned directly between the radome 604 and the surface 602.

Thus, while non RF-emitting or non-RF/optical sensing devices such as ULD's are conventionally positioned within the fuselage area that is controlled with respect to temperature, humidity, and pressure, positioning the non RF-emitting or RF/optical sensing devices outside of this region, for example, behind the radome 604 and forward of the forward bulkhead 602 (in other words, directly between the radome 604 and the forward bulkhead 602), can provide one or more advantages. For example, this region is outside of the pressure vessel, and any gases that might be produced during equipment failure scenarios are isolated from the crew and passengers. Further, this region has no fuel or hydraulic systems and thus is free from fumes that could adversely contribute to a failure scenario. Additionally, this region vents vapors well and includes only equipment and structure that is designed to handle very wet and potentially corrosive environments. Moreover, the region behind the radome 604 and in front of the forward bulkhead 602 is easily accessible when the radome is in the open position, thus facilitating maintenance and installation actions. These advantages can be important considerations for installing equipment that includes some types of high energy density lithium batteries that, during failure, can potentially emit significant quantities of toxic gases and corrosive vapors.

Conversely, positioning a non RF-emitting device powered by a lithium battery between the radome and the forward bulkhead presents one or more design challenges that are overcome by an avionics unit according to the present teachings. For example, any failure effects of the device must be sufficiently contained so that there no significant impact to aircraft or personal safety. In the instance of battery failure, containment of the failing device must ensure that no fragments or pieces of the equipment are ejected or thrown, that no flame, sparks or incandescent particles are ejected from the equipment, that toxic or corrosive gases produced by the failure are have no significant adverse effects on personnel or aircraft, and that thermal emission of the device from, for example, ejected particles are negated. Further, the installed unit must not interfere with the RF operations of the critical aircraft systems mounted under the radome or present any mechanical interference, for example, mechanical blocking or rubbing of other structures. The installation of the avionics unit should be straight forward and simple, supporting low cost, low impact installation and maintenance to provide affordability and support a successful business case for the installed capabilities.

Thus, an avionics unit assembly in accordance with the present teachings is designed to comply with regulations pertinent to the protection of the aircraft during failure of a self-powered avionics unit, for example, during the failure of a lithium battery that powers the avionics unit. More particularly, the avionics unit assembly is designed to comply with lithium battery special conditions and all other regulations for air quality and airframe compatibility.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An avionics unit assembly for an aircraft, comprising:
an avionics unit;
a battery configured to power the avionics unit;
a housing that encases the battery and the avionics unit, wherein:
the housing comprises a vent port configured to exhaust an emission from the avionics unit during a failure of the avionics unit; and the emission comprises one or more of a gas component, a vapor component, a liquid component, and a particulate component;
a shield element;
a emission shroud defining a receptacle; and
a bracket, wherein the avionics unit, the emission shroud, and the shield element are mounted to the bracket.

2. The avionics unit assembly of claim 1, wherein:
the bracket includes a hole therethrough;
the bracket is positioned between the avionics unit and the emission shroud;
the shield element is mounted to the emission shroud;
the shield element defines a recess; and
the avionics unit assembly is configured such that, during the failure of the avionics unit, the emission passes through the hole defined by the bracket and into the recess to directly impinge on the shield element.

3. The avionics unit assembly of claim 1, wherein:
the emission shroud is positioned between the avionics unit and the bracket; and
the shield element is positioned between the emission shroud and the bracket.

4. The avionics unit assembly of claim 1, further comprising a suppressor positioned between the avionics unit and the emission shroud, wherein the suppressor is configured to filter and/or capture at least one of the liquid component and the particulate component of the emission during the failure of the avionics unit.

5. The avionics unit assembly of claim 4, wherein:
the suppressor is positioned between the avionics unit and the bracket; and
the shield element is positioned between the emission shroud and the bracket.

6. The avionics unit assembly of claim 4, wherein the suppressor is positioned between the avionics unit and the shield element, and the avionics unit is mounted directly to the bracket.

7. The avionics unit assembly of claim 4, wherein the suppressor and the emission shroud are positioned between the avionics unit and the shield element, and the avionics unit is directly mounted to the bracket.

8. The avionics unit assembly of claim 1, wherein the bracket defines a plurality of fastener holes therethrough configured to mount the avionics unit to a forward bulkhead of the aircraft.

9. The avionics unit assembly of claim 1, wherein the avionics unit is a low-frequency underwater locator device.

10. An avionics unit assembly for an aircraft, comprising:
an avionics unit;
a battery configured to power the avionics unit;
a housing that encases the avionics unit and the battery, wherein:
the housing comprises a vent port configured to exhaust an emission from the avionics unit during a failure of the avionics unit; and
the emission comprises one or more of a gas component, a vapor component, a liquid component, and a particulate component;
a suppressor mounted to the avionics unit and configured to capture at least one of the particulate component and liquid component of the emission;
a shield element mounted to the avionics unit and positioned within an emission stream of the emission; and
a bracket mounted to the shield element, the suppressor and the avionics unit.

11. The avionics unit assembly of claim 10, wherein the avionics unit is a low-frequency underwater locator device.

12. An avionics unit assembly for an aircraft, comprising:
a self-powered avionics unit comprising a battery as an internal power source, a housing comprising a vent port for exhausting an emission, the emission comprising at least one of a gas component, a vapor component, a liquid component, and a particulate component, wherein the emission is exhausted from the housing through the vent port during a failure of the battery;
a bracket comprising a first mounting arm and a second mounting arm attached to the self-powered avionics unit, wherein the bracket is configured to mount the self-powered avionics unit to a surface;
at least one emission shroud attached to one of the first mounting arm and the second mounting arm, wherein the at least one emission shroud is configured to capture at least one of the particulate component and the liquid component of the emission; and
at least one corrosive jet-resistant shield element mounted to the at least one emission shroud.

13. The avionics unit assembly of claim 12, wherein:
the at least one emission shroud is a first emission shroud and the at least one corrosive jet-resistant shield element is a first corrosive jet-resistant shield element;
the first emission shroud and the first corrosive jet-resistant shield element are mounted to the first mounting arm;
the avionics unit assembly further comprises a second emission shroud and a second corrosive jet-resistant shield element mounted to the second mounting arm;
the avionics unit assembly further comprises a first suppressor positioned between the first emission shroud and the first corrosive jet-resistant shield element; and
the avionics unit assembly further comprises a second suppressor positioned between the second emission shroud and the second corrosive jet-resistant shield element.

14. The avionics unit assembly of claim 12, wherein the avionics unit is a low-frequency underwater locator device.

15. An avionics unit assembly for an aircraft, comprising:
a self-powered avionics unit comprising a battery as an internal power source, a housing comprising a body and at least one detachable end cap configured to provide a vent port for exhausting an emission during failure of the avionics unit, wherein the emission comprises at least one of a gas component, a vapor component, a liquid component, and a particulate component;
a bracket comprising a first arm and at least a second arm attached to the housing;
a first emission shroud mounted to the first arm and a second emission shroud mounted to the second arm; and
a first corrosive jet-resistant shield element mounted to the first emission shroud and a second corrosive jet-resistant shield element mounted to the second emission shroud.

16. The avionics unit assembly of claim 15, further comprising:
a first suppressor positioned between the first emission shroud and the first corrosive jet-resistant shield element; and
a second suppressor positioned between the second emission shroud and the second corrosive jet-resistant shield element.

17. The avionics unit assembly of claim 15, wherein the avionics unit is a low-frequency underwater locator device.

18. An aircraft, comprising:
a forward bulkhead;
a radome mounted to the forward bulkhead, wherein a volume between the forward bulkhead and the radome is external to an aircraft pressure vessel; and
an avionics unit assembly mounted to the forward bulkhead and positioned directly between the radome and the forward bulkhead in a direction perpendicular to a major plane of the forward bulkhead, the avionics unit assembly comprising:
an avionics unit;
a battery configured to power the avionics unit;
a housing that encases the avionics unit and the battery, wherein the housing comprises a vent port configured to exhaust an emission from the avionics unit during a failure of the avionics unit, and the emission comprises one or more of a gas component, a vapor component, a liquid component, and a particulate component;
a shield element;
an emission shroud defining a receptacle; and
a bracket, wherein the avionics unit, the emission shroud, and the shield element are mounted to the bracket.

19. The aircraft of claim 18, wherein the bracket is configured to provide a heat shield for the avionics unit during the failure of the battery.

20. The aircraft of claim 18, wherein:
the bracket includes a hole therethrough;
the bracket is positioned between the avionics unit and the emission shroud;
the shield element is mounted to the emission shroud;
the shield element defines a recess; and
the avionics unit is configured such that, during the failure of the avionics unit, the emission passes through the hole defined by the bracket and into the recess to directly impinge on the shield element.

21. The aircraft of claim 18, wherein the avionics unit assembly further comprises a suppressor positioned between the avionics unit and the emission shroud, wherein the suppressor is configured to filter and/or capture at least one of the liquid component and the particulate component of the emission during the failure of the avionics unit.

22. The aircraft of claim 21, wherein:
the suppressor is positioned between the avionics unit and the bracket; and
the shield element is positioned between the emission shroud and the bracket.

23. The aircraft of claim 18, further comprising a weather radar antenna mounted to the forward bulkhead, wherein the avionics unit is positioned outside of a weather radar antenna swept volume.

24. The aircraft of claim 18, wherein the forward bulkhead comprises at least one equipment maintenance port, wherein a position of the avionics unit permits access to the at least one equipment maintenance port without requiring disassembly and/or removal of other structures positioned adjacent to the radome.

25. The aircraft of claim 18, further comprising a glide slope antenna and an instrument landing system antenna, wherein the avionics unit is positioned so that a centerline of the avionics unit is aligned with a centerline of the glide slope antenna and a centerline of the instrument landing system antenna.

26. The aircraft of claim 25, wherein:
the avionics unit is positioned such that the avionics unit is completely shielded from an electromagnetic field generated by the instrument landing system antenna; and
the instrument landing system antenna is positioned between the radome and the forward bulkhead.

27. The aircraft of claim 25, wherein:
the avionics unit is at least partially unshielded from an electromagnetic electric field generated by the instrument landing system antenna;
the instrument landing system antenna is positioned between the radome and the forward bulkhead; and
the avionics unit has at least one of a height, a length, and width dimension that is less than $\frac{1}{8}^{th}$ of a radio frequency signal wavelength that is output and/or received by the instrument landing system antenna.

28. The aircraft of claim 18, wherein:
the avionics unit is positioned away from a longitudinal, geometric, or bilateral centerline of the aircraft;
the aircraft further comprises an instrument landing system glide slope antenna configured to generate and/or receive an electromagnetic field;
the forward bulkhead is at least partially formed by a vertical I-beam, a horizontal I-beam, or both a vertical I-beam and a horizontal I-beam; and
the avionics unit is completely shielded from the electromagnetic field, and is at least partially shielded from the electromagnetic field by the vertical I-beam, the horizontal I-beam, or both the vertical I-beam and the horizontal I-beam.

29. The aircraft of claim 18, wherein:
the avionics unit is positioned away from a longitudinal, geometric, or bilateral centerline of the aircraft; and
the avionics unit is electrically isolated from the forward bulkhead.

30. A method for manufacturing an aircraft, comprising:
mounting an avionics unit assembly to a bulkhead, wherein the avionics unit assembly comprises:
an avionics unit;
a shield element;
an emission shroud defining a receptacle; and
a bracket, wherein the avionics unit, the emission shroud, and the shield element are mounted to the bracket; and
mounting a radome to the bulkhead wherein, subsequent to the mounting of the avionics unit to the bulkhead and the mounting of the radome to the bulkhead, the avionics unit assembly is positioned directly between the radome and the bulkhead in a direction perpendicular to a major plane of the bulkhead.

31. The method of claim 30, wherein the mounting of the avionics unit to the bulkhead further comprises positioning the avionics unit outside of a weather radar antenna swept volume.

32. The method of claim 30, wherein the bulkhead comprises at least one equipment maintenance port, and the method further comprises positioning the avionics unit at a location that permits access to the at least one equipment maintenance port without requiring disassembly and/or removal of other structures positioned adjacent to the radome.

33. The method of claim 30, wherein:
the avionics unit assembly further comprises a battery configured to power the avionics unit and a housing that encases the battery and the avionics unit;

the housing comprises a vent port configured to exhaust an emission from the avionics unit during a failure of the avionics unit;

the emission comprises one or more of a gas component, a vapor component, a liquid component, and a particulate component; and the method further comprises:
mounting the emission shroud to the bracket; and
mounting a corrosive jet-resistant shield element to the emission shroud.

34. The method of claim 33, wherein the mounting of the emission shroud to the bracket further comprises positioning the bracket such that the emission ejected through the vent port during the failure of the avionics unit passes through a hole defined by the bracket, into a recess defined by the emission shroud, and onto the corrosive jet-resistant shield element.

35. The method of claim 33, further comprising positioning a suppressor between the avionics unit and the emission shroud, wherein the suppressor is configured to filter and/or capture the particulate component and a fluid component of the emission prior to an ejection of the emission from the avionics unit.

* * * * *